US010375667B2

(12) United States Patent
Kothari et al.

(10) Patent No.: US 10,375,667 B2
(45) Date of Patent: Aug. 6, 2019

(54) ENHANCING INDOOR POSITIONING USING RF MULTILATERATION AND OPTICAL SENSING

(71) Applicant: Cisco Technology, Inc., San Jose, CA (US)

(72) Inventors: Shanay Ravin Kothari, San Francisco, CA (US); Ian Matthew Snyder, San Francisco, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 15/834,990

(22) Filed: Dec. 7, 2017

(65) Prior Publication Data

US 2019/0182790 A1  Jun. 13, 2019

(51) Int. Cl.
 *H04W 64/00* (2009.01)
 *H04L 29/08* (2006.01)
 *H04W 88/08* (2009.01)
 *G06T 7/20* (2017.01)
 *H04B 7/08* (2006.01)

(52) U.S. Cl.
 CPC ............. *H04W 64/00* (2013.01); *G06T 7/20* (2013.01); *H04L 67/10* (2013.01); *H04W 88/085* (2013.01); *H04B 7/0857* (2013.01)

(58) Field of Classification Search
 CPC ...... H04W 64/00; H04W 88/085; G06T 7/20; H04L 67/10; H04B 7/0857
 USPC ......................................... 340/539.1–539.18
 See application file for complete search history.

(56) References Cited

U.S. PATENT DOCUMENTS

| 4,236,068 | A | 11/1980 | Walton |
| 5,642,303 | A | 6/1997 | Small et al. |
| 5,751,223 | A | 5/1998 | Turner |
| 6,812,824 | B1 | 11/2004 | Goldinger et al. |
| D552,603 | S | 10/2007 | Tierney |
| 7,283,046 | B2 * | 10/2007 | Culpepper ............ B60R 25/102 340/539.13 |
| 7,573,862 | B2 | 8/2009 | Chambers et al. |

(Continued)

FOREIGN PATENT DOCUMENTS

| WO | WO 2013/020126 | 2/2013 |
| WO | WO 2014/098556 | 6/2014 |
| WO | WO 2018/009340 | 1/2018 |

OTHER PUBLICATIONS

"I Love WiFi, The difference between L2 and L3 Roaming Events," Apr. 1, 2010, 6 pages.

(Continued)

*Primary Examiner* — Eric Blount
(74) *Attorney, Agent, or Firm* — Polsinelli PC (57) ABSTRACT

Systems and methods are disclosed for enhancing target positioning. A broadcast signal from a device is received by at one or more access points, where a first position area of the device is determined from an analysis of the broadcast signal. A second position area of the target, which is within the first position area, is determined by scanning pixels within the first position area in an image captured by the camera and, based on the scanned pixels, at least one target comprising a portion of the pixels is detected. The target within the image is classified, and based on the classification and portion of the pixels comprising the target, the second position area of the target within the first position of the image is triangulated.

20 Claims, 8 Drawing Sheets

(56) References Cited

U.S. PATENT DOCUMENTS

| | | | |
|---|---|---|---|
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,458,184 B2 | 6/2013 | Dorogusker et al. | |
| D691,636 S | 10/2013 | Bunton | |
| 8,549,638 B2 | 10/2013 | Aziz | |
| 8,615,254 B2 * | 12/2013 | Jamtgaard | H04W 4/029 455/456.1 |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| D757,424 S | 5/2016 | Phillips et al. | |
| D759,639 S | 6/2016 | Moon et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| D776,634 S | 1/2017 | Lee et al. | |
| 9,544,337 B2 | 1/2017 | Eswara et al. | |
| 9,609,504 B2 | 3/2017 | Karlqvist et al. | |
| 9,642,167 B1 | 5/2017 | Snyder et al. | |
| 9,654,344 B2 | 5/2017 | Chan et al. | |
| 9,713,114 B2 | 7/2017 | Yu | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 2003/0087645 A1 | 5/2003 | Kim et al. | |
| 2003/0116634 A1 | 6/2003 | Tanaka | |
| 2004/0169587 A1 * | 9/2004 | Washington | G06K 7/10079 340/573.1 |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0152057 A1 * | 7/2007 | Cato | G01S 17/48 235/462.01 |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0213391 A1 * | 7/2015 | Hasan | G06Q 10/06398 705/7.42 |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0099847 A1 | 4/2016 | Melander et al. | |

(56) References Cited

U.S. PATENT DOCUMENTS

| | | | |
|---|---|---|---|
| 2016/0105408 A1 | 4/2016 | Cooper et al. | |
| 2016/0127875 A1 | 5/2016 | Zampini, II | |
| 2016/0146495 A1 | 5/2016 | Malve et al. | |
| 2016/0344641 A1 | 11/2016 | Javidi et al. | |
| 2017/0026974 A1 | 1/2017 | Dey et al. | |
| 2017/0214551 A1 | 7/2017 | Chan et al. | |
| 2018/0069311 A1 | 3/2018 | Pallas et al. | |
| 2018/0084389 A1 | 3/2018 | Snyder et al. | |
| 2018/0295473 A1* | 10/2018 | Wirola | H04W 4/026 |

OTHER PUBLICATIONS

Carter, Steve SR., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco Systems, Inc., "Wi-FI Location-Based Services 4.1 Design Guide," May 20, 2008, 206 pages.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp., 171-175.

Cisco ASR 5x00 Mobility Management Entity Administration Guide, Version 15.0, Last updated Jun. 13, 2014, Cisco, 1-266.

Cox, Jacob H. Jr., et al., "Advancing Software-Defined Networks: A Survey," IEEE, Oct. 12, 2017, pp. 25487-25526.

Saraiva de Sousa, Nathan F., et al., "Network Service Orchestration: A Survey," IEEE Communications Surveys & Tutorials, Mar. 23, 2018, pp. 1-30.

Geller, Michael, et al. , "5G Security Innovation with Cisco," Whitepaper Cisco Public, Jun. 8, 2018, pp. 1-29.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

\* cited by examiner

ENHANCING INDOOR POSITIONING USING RF MULTILATERATION AND OPTICAL SENSING

TECHNICAL FIELD

The present disclosure pertains to wireless cameras, and more specifically to wireless cameras using RF multilateration and machine vision.

BACKGROUND

Wireless security cameras are closed-circuit television (CCTV) cameras that transmit a video and audio signal to a wireless receiver through a radio band. Many wireless security cameras require at least one cable or wire for power—the term "wireless" is sometimes used to refer only to the transmission process of video and/or audio. However, some wireless security cameras are battery-powered, making the cameras truly wireless from top to bottom.

Wireless cameras are proving very popular among modern security consumers due to their low installation costs and flexible mounting options. For example, there is no need to run expensive video extension cables, and wireless cameras can be mounted and/or installed in locations previously unavailable to standard wired cameras. In addition to the ease of use and convenience of access, wireless security cameras allow users to leverage broadband wireless internet to provide seamless video streaming over the internet.

Indoor tracking of people and objects is an area of critical importance for a wide variety of industries. Purely radio frequency (RF) or purely camera based (e.g., machine vision) tracking solutions have performance or corner case limitations that prevent them from becoming robust business intelligence tools.

For example, all existing methods of RF based indoor positioning have several limitations, ranging from large position inaccuracy (e.g., methods such as RF proximity, Received Signal Strength Indicator (RSSI) trilateration) to complex hardware architectures (e.g., RF triangulation, Time of Arrival (ToA), Time Difference of Arrival (TDoA)) to hefty processing requirements (e.g., RSSI fingerprinting). RSSI, or the Received Signal Strength Indicator, is a measure of the power level that a RF device, such as WiFi or 3G client, is receiving from the radio infrastructure at a given location and time. Other methods, such as RF multi angulation, use complex phased antenna arrays to determine both the RSSI and angle of arrival of an incoming RF signal. However, multiple radios dedicated to just this on a single device are needed in order to work. Moreover, RF Time of Arrival methods are cost prohibitive for anything that is shorter range than GPS because the hardware required to detect shorter flights is too expensive for commercial deployment.

Another method of increasing the accuracy of RF based indoor positioning is the use of RSSI fingerprinting to better model the RF surroundings. Traditionally this is done by placing a fixed beacon at a known distance from the access points and continuously monitoring the RSSI of its emissions. These are compared to the fixed Line of Sight approximated values to better model the access points surroundings. Modelling accuracy tends to increase with the total number of beacons deployed. However, deploying additional always-on beacons increases cost, and the total number of beacons rises at ⅓ the rate of the deployed access points for the least accurate method. Accordingly, in certain high deployment scenarios, one might not have the space to accommodate this.

Meanwhile, camera based indoor tracking solutions using computer vision/machine vision struggle with accuracy, even when using most advanced deep learning algorithms (trained by large datasets) and using very powerful hardware in the cloud. And for the instances in which all processing needs to be done on the device, there are even more constraints. There is a need to reduce computer vision processing requirements so that the processing requirements can fit within the camera's processing budget, but still offer people and object tracking benefits to users.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, and devices are disclosed for enhancing target positioning. A broadcast signal from a device is received by one or more access points, where a first position area of the device is determined from an analysis of the broadcast signal. A second position area of the target, which is within the first position area, is determined by scanning pixels within the first position area in an image captured by the camera. Based on the scanned pixels, at least one target comprising a portion of the pixels is detected. The target within the image is classified, and based on the classification and portion of the pixels comprising the target, the second position area of the target within the first position of the image is triangulated.

Example Embodiments

The disclosed technology addresses the need in the art for developing an easy to use and easy to deploy camera and wireless access point(s) system without the limitations due to large position inaccuracy, complex hardware architectures, and/or hefty processing requirements (e.g., methods like RF proximity, RSSI trilateration, RF triangulation, ToA, TDoA, RSSI fingerprinting, etc.). Thus, while these processes can be used individually for the detection and location of people and/or objects, these processes are both computationally and financially expensive. Moreover, these detection techniques produce low detection confidence, especially for wireless cameras. Accordingly, computer vision processing requirements need to be reduced so that the processing requirements can fit within the camera's processing budget, and yet still offer accurate people and object tracking capabilities.

The disclosed technology provides a solution to the technological problems outlined above by using a process that combines aspects of RF multilateration with machine vision (e.g., camera sensing). By using the output of RF multilateration techniques in conjunction with machine vision (such as in optical sensing), more accurate methods, systems, and devices can be made for enhancing target positioning within images captured by a wireless camera. Moreover, since this process reduces the search area around the target, processing time and resources are reduced as well. This provides the benefit of saving on expensive hardware and increasing processing speeds without sacrificing tracking and location accuracy.

Applying the techniques of RF multilateration with camera machine vision provides a number of benefits. For example, the technique enables the accuracy of RF multiangulation based indoor positioning without the hardware complexity and can provide accurate indoor (e.g., 2D) positioning using bilateration (a method that was hitherto impossible to do with just RF). The technique also enables higher confidence in computer vision object detection by pairing radio broadcast signature information to what is specifically or currently being looked at, and can confidently locate visually obscured or "invisible" objects. Moreover, the technique allows for tracking and/or detecting additional context to the objects being tracked that can be highly valuable for business intelligence purposes.

Thus, in the embodiments disclosed, target positioning is enhanced when a broadcast signal from a device is received by at least two wireless access points. From the at least two wireless access points, a first position area of the device is determined from an analysis of the broadcast signal according to a multilateration model (or similar model, such as methods from RSSI bilateration, trilateration, etc.). A position of the target can be refined within the first position area by scanning, by a camera using machine vision (e.g., optical sensing), pixels within the first position area only. Based on those scanned pixels, at least one target is detected as being present in an image. Each target within the image is classified based on type, and, based on the classification and portion of the pixels making up the target, a second, more accurate position area of the target is triangulated within the first position area of the image.

Figure 1:
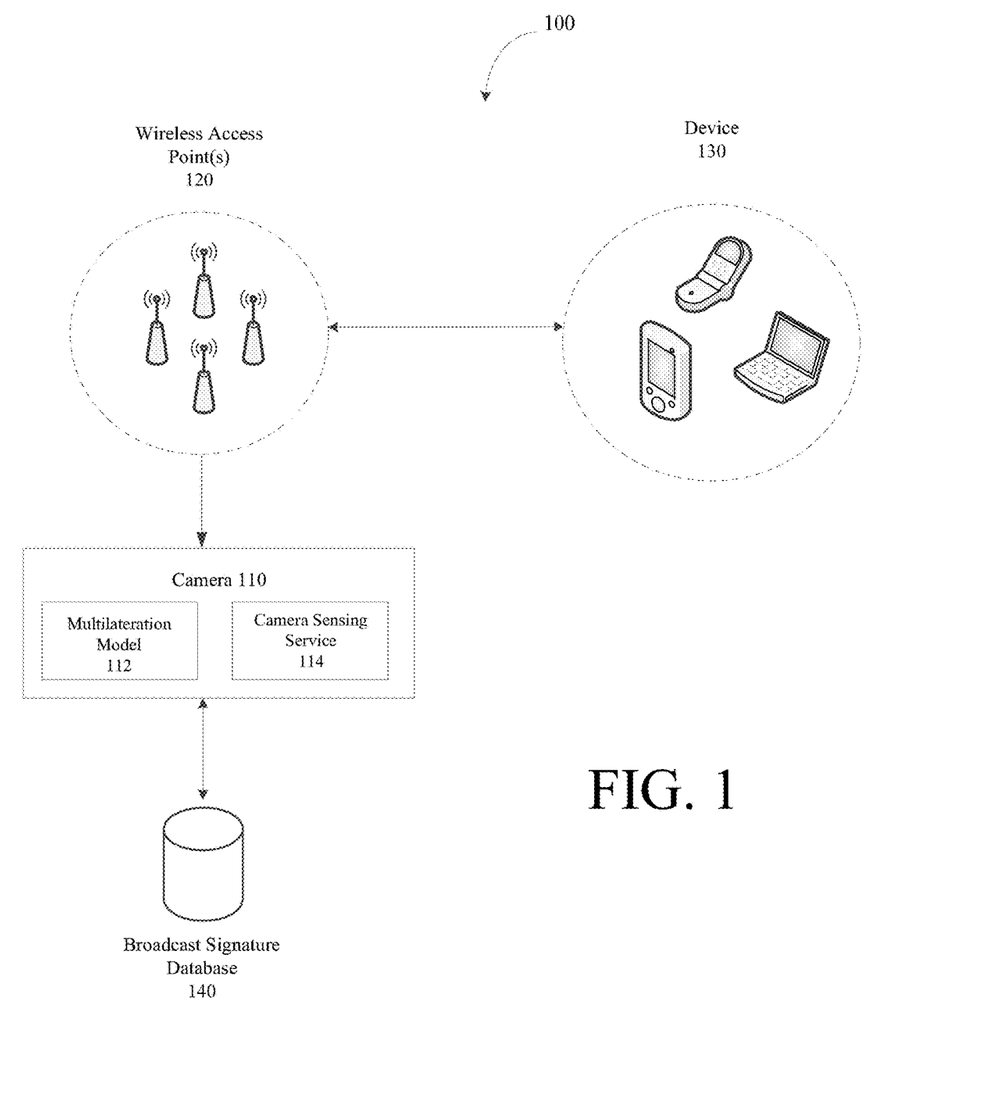
FIG. 1 illustrates an example embodiment of a system using a camera and wireless access points based approach to locating one or more targets.

FIG. 1 illustrates an example embodiment of a system using a camera and wireless access points to locate one or more targets. System 100 includes multiple wireless access points 120 in communication with device 130 (e.g., a target device to be located). While at least two wireless access points 120 for capturing a broadcast signal from device 130 are needed in system 100, device 130 may be one or more devices including, but not limited to, mobile phones, laptops, PDAs, badges, etc.

System 100 further includes camera 110 in communication with wireless access points 120. Camera 110 includes at least one receiver for receiving, from wireless access points 110, a broadcast signal from device 130. System 100 can determine a first position area corresponding to the location of device 130 by analyzing the broadcast signal according to multilateration model 112. Multilateration model 112 can include any number of models corresponding to RF tracking, including bilateration, trilateration, and/or any similar models. In addition, while the embodiments depicted in FIG. 1 show multilateration model 112 being performed at camera 110, other embodiments may perform multilateration model 112 remote from camera 110 (such as in the cloud).

Camera 110 is also trained with algorithms designed to locate both people and objects within an environment. Camera sensing service 114, for example, analyzes pixels within video frames captured by camera 110 in order to detect people and/or objects (e.g., targets) within its captured field of view (FOV). This is most commonly done through machine vision that distinguishes objects through optical sensing, although infrared cameras may use analogous infrared sensing to distinguish objects (and indeed, any frequency range can be used as long as the target object emits them).

In some embodiments, system 100 includes broadcast signature database 140, which can be a cloud connected database of radio broadcast signatures. Broadcast signatures can include, for example, the OUI/MAC address specified by the IEEE and/or any other identifying information in the radio transmission format. In some embodiments, broadcast signature database 140 can be local to camera 110.

An advantage of system 100 is that most of it requires a one-time initial setup, requiring updates only when a new node is added to the mix (i.e., a wireless access point or camera).

Figure 2:
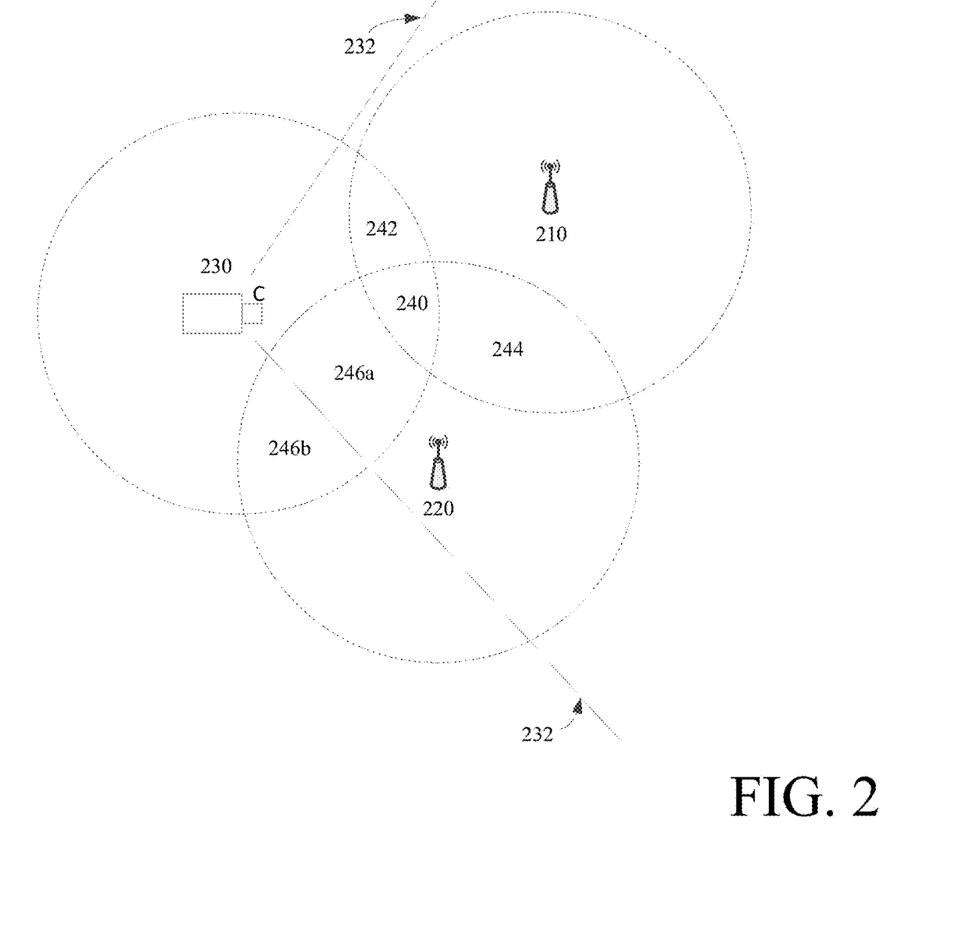
FIG. 2 shows an example implementation of a single camera setup embodiment including bilateration and trilateration zones.

FIG. 2 shows an example implementation of a single camera setup embodiment including bilateration and trilateration zones. In the embodiment shown, two wireless access points (210, 220) and camera 230 are shown. Camera 230 also acts as an access point as well as wireless access points 210, 220 in the shown embodiment, although other embodiments may include a camera without wireless access capabilities and/or may include any number of additional wireless access points.

Referring back to the embodiment shown, the position of each node of the system (e.g., camera 230 and wireless access points 210, 220) and the scanning radio coverage for each of the wireless access points are known to some accuracy within their surrounding environment. The scanning radio coverage ideally extends to some radius from the wireless access point (assuming there are no intervening obstructions), and can be known or provided by OEM.

The angle of camera 230 with respect to the floor of the environment is also known to some accuracy. This allows accurate mapping of camera 230's pixels to its field of view, FOV (FOV is denoted in FIG. 2 as 232). In some implementations, scanning device positioning (e.g., wireless access points 210, 220 and/or camera 230 with wireless access capabilities) or camera angle with respect to the floor may be automatically determined using sensors inside the hardware of the devices.

Each wireless access point scans for the broadcast signature of a device within the zone of its radio coverage capabilities. If the broadcast signature of the device is detected by two or more wireless access points, RSSI multilateration, trilateration, or a similar technique can be used to determine a rough estimate of the device's location. For example, in FIG. 2, the device is located within trilateration zone 240 if camera 230, wireless access point 210, and wireless access point 220 detect the broadcast signature. Conversely, the device is located within bilateration zone 242 if only camera 230 and wireless access point 210 detect the broadcast signature; is located within bilateration zone 244 if only wireless access point 210 and wireless access point 220 detect the broadcast signature; and is located in bilateration zones 246a or 246b if only camera 230 and wireless access point 220 detect the broadcast signature.

The rough estimate of the device's location can then be improved through computer vision algorithms on camera 230. Machine vision via the use of computer vision algorithms can be performed in only the zone identified through the RSSI multilateration techniques (or similar) Thus, if RSSI multilateration indicates that the device is within trilateration zone 240, computer vision algorithms would be performed only to the pixels that map to the area within trilateration zone 240. This gives the system the ability to significantly lower the computational requirements for object tracking, and/or increases the performance and accuracy for a given computational resource pool. During the search, camera 230 will detect within its FOV 232 any objects or persons of interest (e.g., target object) for location and/or tracking.

The location of the detected target can be determined from a scan of the given pixel grid captured by camera 230, since the camera tilt angle and the FOV to pixel mapping is known. Thus, the system can triangulate or narrow down the location of a target to a more accurate position within trilateration zone 240. Thus, the location capabilities of the system is limited only by the resolution limit of camera 230 and/or the distance of the detected target while saving computational power, resources, and increasing processing speed.

Figure 3:
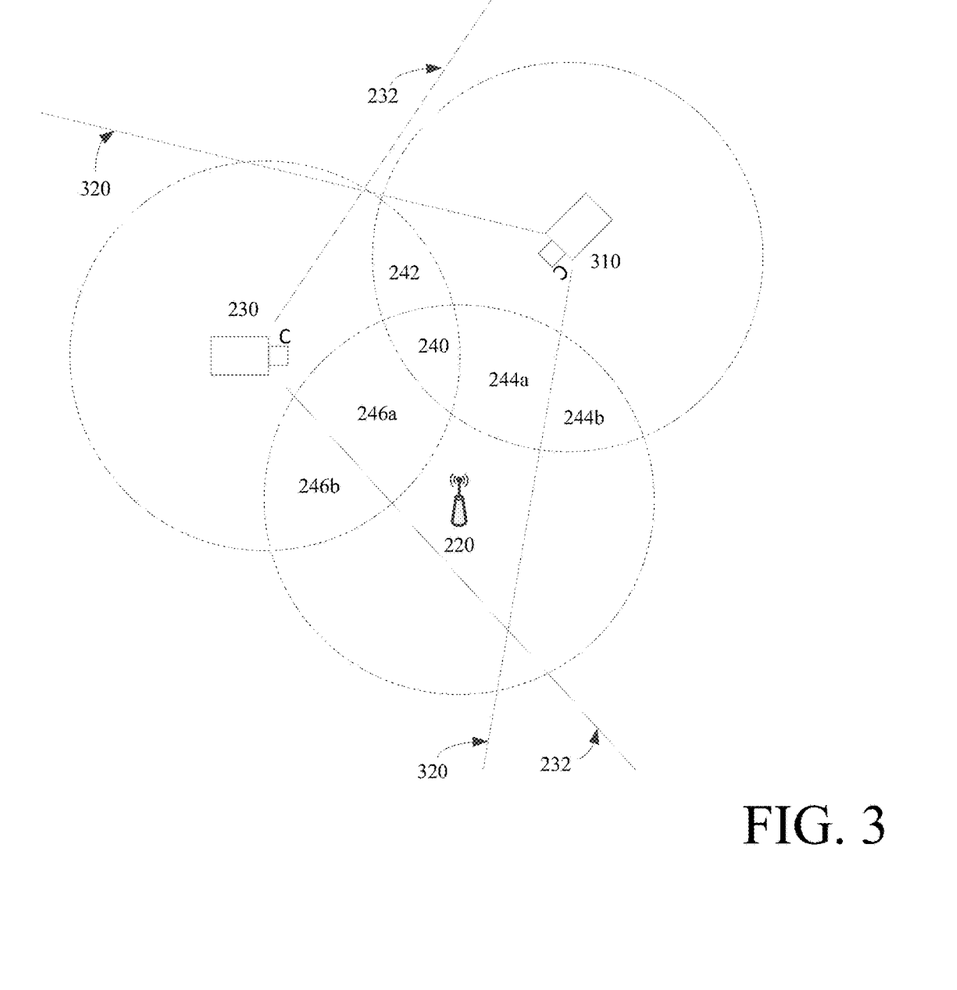
FIG. 3 shows an example implementation of a multiple camera setup embodiment.

FIG. 3 illustrates a variation of system 100 in which two cameras with wireless access capabilities are shown. Camera 310 is positioned such that its FOV 320 overlaps a portion of camera 230's FOV 232. In this embodiment, the location of a detected target can be triangulated to even finer resolution through comparison between the two cameras. For example, if camera 230 places the target within bilateration zone 244, whether the target appears in camera 310's FOV 320 can determine whether the location can be refined to zone 244a (within the FOV) or 244b (outside the FOV). Moreover, the machine vision techniques of camera 310 will have its own resolution associated with its pixel mapping abilities, and thus can narrow down the range of possible locations by comparison to a corresponding detection and pixel mapping done by camera 230. Thus, the accuracy of object and/or person location increases as the number of cameras with machine vision capabilities increase.

Figure 4:
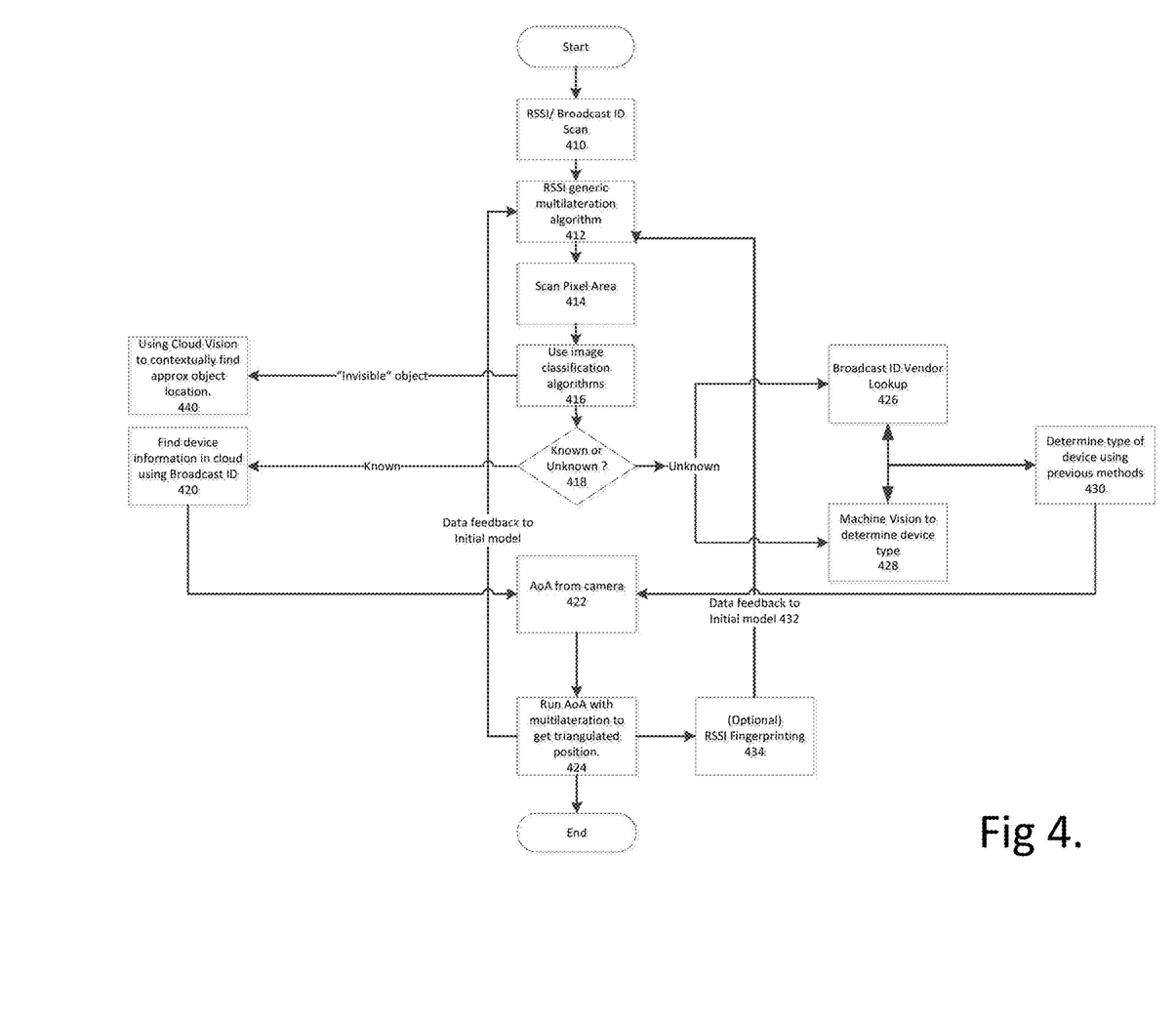
FIG. 4 is a flow chart illustrating an example embodiment for single device detection.

FIG. 4 shows a flow chart illustrating an example embodiment for single device detection, regardless of the number of cameras or wireless access points present in system 100. The method begins when all system nodes with wireless access point capabilities scan for the RSSI and/or broadcast signature of a device (step 410). This is mainly done through RF frequencies, although scanning any frequency that the device is broadcasting or emitting at could yield the same effect. Once the RSSI and broadcast signature of the device on two or more wireless access points are received, a generic RSSI multilateration algorithm is used to obtain an approximate area where the object is located (step 412).

Assuming that the approximated area is located in the FOV of the camera, a scan of the corresponding pixel grid can be limited to the approximated area (step 414). Thus, the specific pixels within the approximate area can be scanned for any objects or persons in the images captured by the camera. The pixels corresponding to portions of the approximate area are known or determined based on the camera tilt angle and the FOV to pixel mapping. If a target of interest (e.g., a device detected through RSSI or its broadcast signature, or a person associated with the device) is detected within one or more pixels, a more accurate location of the target can be determined based on pixel mapping the target to a smaller area or position. The smaller area or position is limited only by the resolution of the camera (or combination of cameras), which typically have better resolution than RF multilateration.

Figure 5:
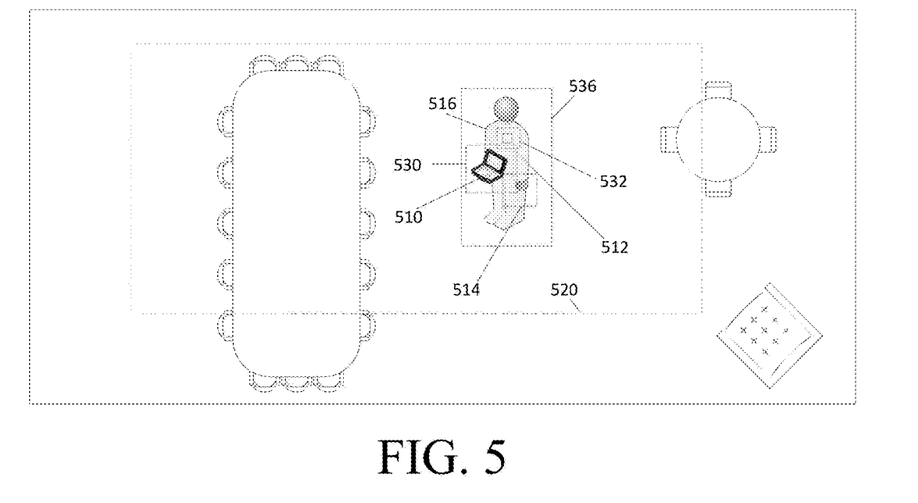
FIGS. 5, 6, and 7 illustrates example embodiments of target tracking, including visible and invisible object tracking.

FIG. 5, for example, illustrates this concept. A camera FOV with multiple objects detected by wireless access points within multilateration zone 520 is shown. The objects detected by the wireless access points are laptop 510, access badge 512, and phone 514 (the cell phone in this example is within the pocket of target 516 but is still detectable through its RSSI/broadcast signature). The camera then performs a scan of the pixels within multilateration zone 520 and detects, through machine vision, target 516 (in area 536), laptop 510 (in area 530), and access badge 512 (in area 532). Phone 514 is not detected in the pixel scan since it is hidden in target 516's pocket. In this instance, the system can take an educated guess that target 516 in area 536 is carrying phone 514, despite not finding visual evidence through machine vision.

Additionally, some embodiments classify the target within the image, using one or more image classification algorithms (step 416) that match the machine vision detected target to a known object. The image classification algorithms can be one or more models of devices and people in different positions or orientations. While the image classification algorithms can be generated, stored, and/or processed locally on the camera, in some embodiments, the classification of the target can be based on a model stored remotely from the device (e.g., such as in the cloud). The classification may further narrow down a device's dimensions and size based on a match to a known device model (which, based on the classification of the target and portion of the pixels that include the target, can help refine or triangulate the device's position).

In FIG. 5, for example, target 516 may be classified as a person in general (versus a device or object), or may be classified further to a particular individual (e.g., a specific employee) based on facial recognition. Laptop 510 may be classified as a device, specific type of device (e.g., a laptop), make and/or model (e.g., Apple MacBook Air 13.3-Inch laptop), etc. Access badge 512 can be classified accordingly as well.

Thus, the method may determine, based on the classification (or lack thereof), that a device is a 'known' device or an 'unknown' device (step 418). The device can be a 'known' device, and subsequently identified, for example, through one or more matches with the image classification model. Or, in some embodiments, the device can be known through its broadcast signature, which may include identifying information about the device (e.g., model, manufacturer, dimensions, etc.).

Depending on the application of this system, a list of 'known' devices can be accessed to determine a match. For example, the list of 'known' devices can include, but is not limited to, an employee badge, mobile/laptop (with or without a Meraki Systems Manager installed), and/or any device with a detectable and distinguishable broadcast signature. For example, in embodiments where the list of known devices is part of a cloud backed database, more data than just the Broadcast signature can be accessed. For example, device information can be found in the cloud using its broadcast signature or ID (step 420).

Device information can be any information associated with the device. For example, an employee badge and/or mobile laptop can be associated with a known employee. The system can include a user profile associated with the employee, including distinguishing features detectable by the camera (e.g., facial features based on a photo, hair/eye color, build, height, etc.). Other information can include device design parameters, such as device dimensions, that can provide some scale to the images (e.g., a laptop of known length and width carried by a person can narrow down the person's location depending on how many pixels it extends across).

Once the device is identified by the camera's machine vision, the accuracy of its approximated location from RSSI/broadcast ID scanning can be improved based on determining the angle of arrival (AoA) from the camera (step 422) and then running a pixel mapping model to get a triangulated position based on the AoA and multilateration model (step 242).

In some embodiments, the system can provide security features by quickly narrowing down on any target and the surroundings, and then checking for discrepancies. For example, a device within the environment can be identified based on a broadcast ID or application installed on the device that connects with the wireless access points. The broadcast ID or application installed on the device can be associated with a particular user, such as an employee, that is assigned to the device. The application can connect with a wireless access point and communicate an ID that identifies the particular user or device assigned to the user. After the system and/or camera classifies the target in the camera images as a person, machine vision applied to that person can determine whether there is a discrepancy in possession of the device. If the system identifies that the person in the camera images is not the user assigned to the device, the discrepancy in possession can be detected and security personnel (or other appropriate authority) notified.

Security features that check for discrepancies in device possession can therefore be performed with respect to any device assigned to a user, including ID badges that broadcast to wireless access points. For example, an unauthorized individual with an employee's ID badge can be flagged down based on a failure to match with the assigned employee's features (e.g., the facial features don't match, the individual is much taller than the employee, etc.). The system can monitor for unauthorized individuals continuously and around the clock as a way to increase workplace safety. For example, in FIG. 5, facial recognition can confirm that target 516 is an employee assigned to access badge 512 (or, if there is no facial match, send a notification to the system that access badge 512 has been stolen). In fact, all the devices within target 516's possession can be checked for authorization to be in possession (e.g., laptop 510, which may contain access to sensitive information).

In some instances, however, the device may be unknown (step 418). For an 'unknown' device, there are at least two separate ways to identify an object: (1) through the broadcast signature and (2) machine vision. These methods of device identification can be used separately or in conjunction in the disclosed system.

For an unknown device, the system can look up a vendor associated with the broadcast signature (step 426). Additionally and/or alternatively, the camera's machine vision can determine or make an educated guess as to the device's type (e.g., mobile phone, laptop, etc.) (step 428).

For example, if the broadcast signal cannot be used to uniquely identify the device, the classification of the device can proceed by identifying a broadcast signature within the broadcast signal and identifying a type of the device based on comparing the broadcast signature with a number of stored broadcast signatures with associated device information. The broadcast signatures can, for example, be stored in a database either local to the camera or remote from the camera (such as a cloud database). The broadcast signature may contain an identifier that identifies the vendor of the device. Based on a determination of the identity of the vendor, the type of the device can be inferred or a request for broadcast signatures associated with devices sold or produced by the vendor can be obtained for comparison to the detected broadcast signal.

Figure 6:
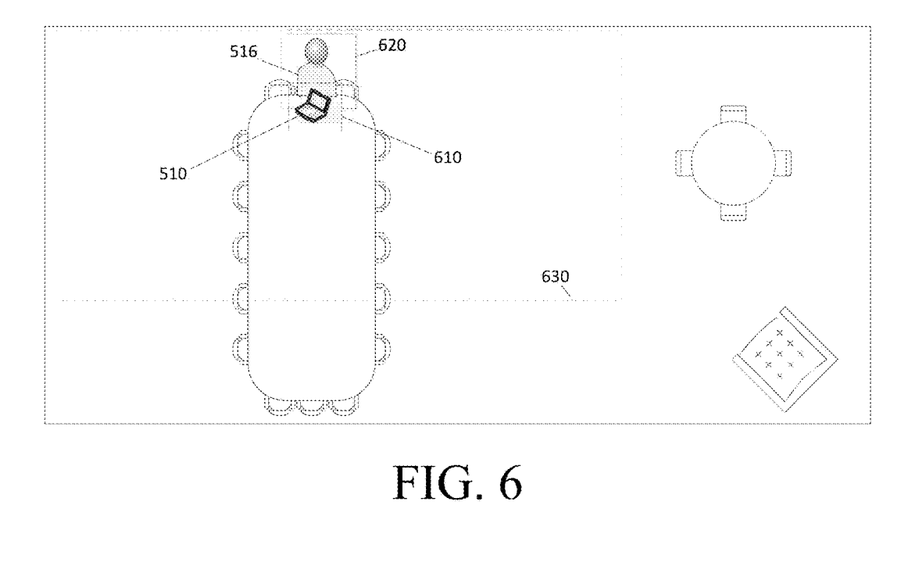

Moreover, the type of the device can be further refined by machine vision applied to multilateration zone 520. For example, a vendor's OUI can limit the object type down to, say, 1 or 2 types. The vendor may produce badges only, or phones and laptops only. In FIG. 6, assuming laptop 510 is an unknown device (e.g., does not broadcast a unique ID recognized by the system), the broadcast signal may include a signature that identifies the vendor. In this case, for example, the vendor may be identified as Apple. The type and formatting of the broadcast signature can also reveal the hardware capabilities, further limiting the possible object types. The system and/or camera can then access a database (either compiled by the system, provided by Apple or another party, etc.) to match within some threshold the broadcast signal from laptop 510 that is received by the wireless access points to a number of stored Apple device profiles. If a match is found, the system can receive, from the database or vendor, information related to the device (such as laptop dimensions), which can be used with machine vision to confirm the device's conformation to the received device information (e.g., laptop 510 spans an area of pixels roughly equivalent to the dimensions provided in area 610, and therefore laptop 510 is determined to be consistent with a broadcast signature associated with an Apple MacBook Air 13.3-Inch laptop). As a result, the OUI received by the wireless access points can be used to determine the vendor of a particular device, and this information in conjunction with applying machine vision techniques to the pixel area scan can give an accurate estimation of the device type (step 430).

In some embodiments, the camera can track targets over a period of time to identify an unknown device. In FIG. 5 at some time (say t=0 s), for example, the broadcast signal from laptop 510 can be contaminated with the broadcast signals from access badge 512 and/or phone 514. Thus, even if laptop 510 is broadcasting a unique signature, that unique signature may be washed out and/or overlap with those of the other devices, producing a signal that doesn't seem to match anything in the broadcast signature database. However, at some time later (t=75 s) in FIG. 6, target 516 has moved to sit down at a conference table (identified as area 620) within multilateration zone 630. At this point, target 516 may no longer be located proximately with the other devices, and the camera can easily distinguish laptop 510 in area 610. This can either confirm an initial guess and/or be used to refine RSSI fingerprinting models used in the initial multilateration techniques (see step 432).

In some embodiments, after the device location is refined based on the angle of arrival of the device with respect to the camera, RSSI triangulation, RSSI fingerprinting, or both can also be refined or updated (step 434). Both these models of localization can be used to further increase the baseline accuracy of the initial RSSI multilateration technique (through RSSI triangulation) and help map the immediate room environment (through RSSI fingerprinting).

For example, a broadcast signature within the broadcast signal from a device in multilateration zone 520 can be received by the surrounding wireless access points. The type of device can be identified based on machine vision applied to the initial multilateration area. Whether or not the device is 'known' or 'unknown', once the device is identified, its broadcast signature can be noted by the system and/or camera. The broadcast signature store can then be updated, if needed, based on the received broadcast signature and identified type of device. In this way, the updated broadcast signature can dynamically update the broadcast signature databases over time, which increases the accuracy of the multilateration model applied to subsequent devices. In some embodiments, the broadcast signature database and multilateration model can be updated continuously.

Figure 7:
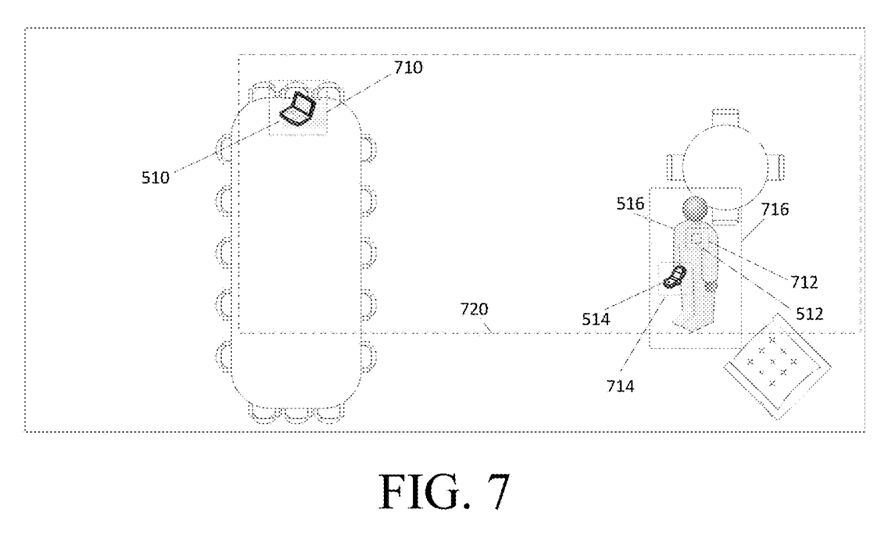

In some embodiments, the system and/or camera can detect 'invisible' targets or objects. This type of functionality can be performed locally on the camera or can be performed remotely (e.g., using cloud vision) to contextually find an 'invisible' object's location (step 440). FIGS. 5 and 7 illustrate how this is done.

At time t=0 hours, FIG. 5 shows multilateration zone 520 that includes target 516 and phone 514. While target 516 can be seen by the camera through machine vision, phone 514 is not visible since it's inside target 516's pocket. Thus, since the broadcast signature of phone 514 identifies the device as a mobile device, but machine vision only captures and identifies a person, laptop, and/or access badge within its FOV, the system and/or camera makes an educated guess or determination that machine vision cannot detect the device associated with the target even though its presence is known (e.g., detectable by multilateration only).

In this instance, the system and/or camera can track the target associated with the 'invisible' device over time until the camera's machine vision picks it up. Thus, for example, the system and/or camera tracks target 516 from, say, FIG. 6 with target 516 sitting at conference table at t=1 hour until some later time at FIG. 7, when target 516 has moved to another portion of the room at t=2 hours. FIG. 7 shows when target 516 takes phone 514 out of their pocket, thus exposing phone 514 to the camera's view and enabling machine vision detection. Once the device becomes detectable by machine vision, the device is identified—in this case, phone 514 is identified as a mobile device that matches within some threshold the broadcast signature previously detected by the wireless access points.

In some instances, the device detected and identified by machine vision may not match the detected broadcast signature. When that happens, some embodiments can update the RSSI multilateration models to increase the accuracy of the system. For example, in FIG. 7 the system/camera can identify the objects within multilateration zone 720, such as laptop 510 within area 710, target 516 within area 716, access badge 512 within area 712, and phone 514 within area 714. The wireless access points can detect a broadcast signature that initially classifies 'invisible' phone 514 as a certain model (e.g., iPhone 5s). However, once phone 514 is detected through machine vision, the camera/system may optically identify phone 514 as another model (e.g., iPhone X). Using this information, the multilateration models can update and/or store the detected broadcast signature as a signature corresponding to an iPhone X rather than an iPhone 5s.

Figure 8:
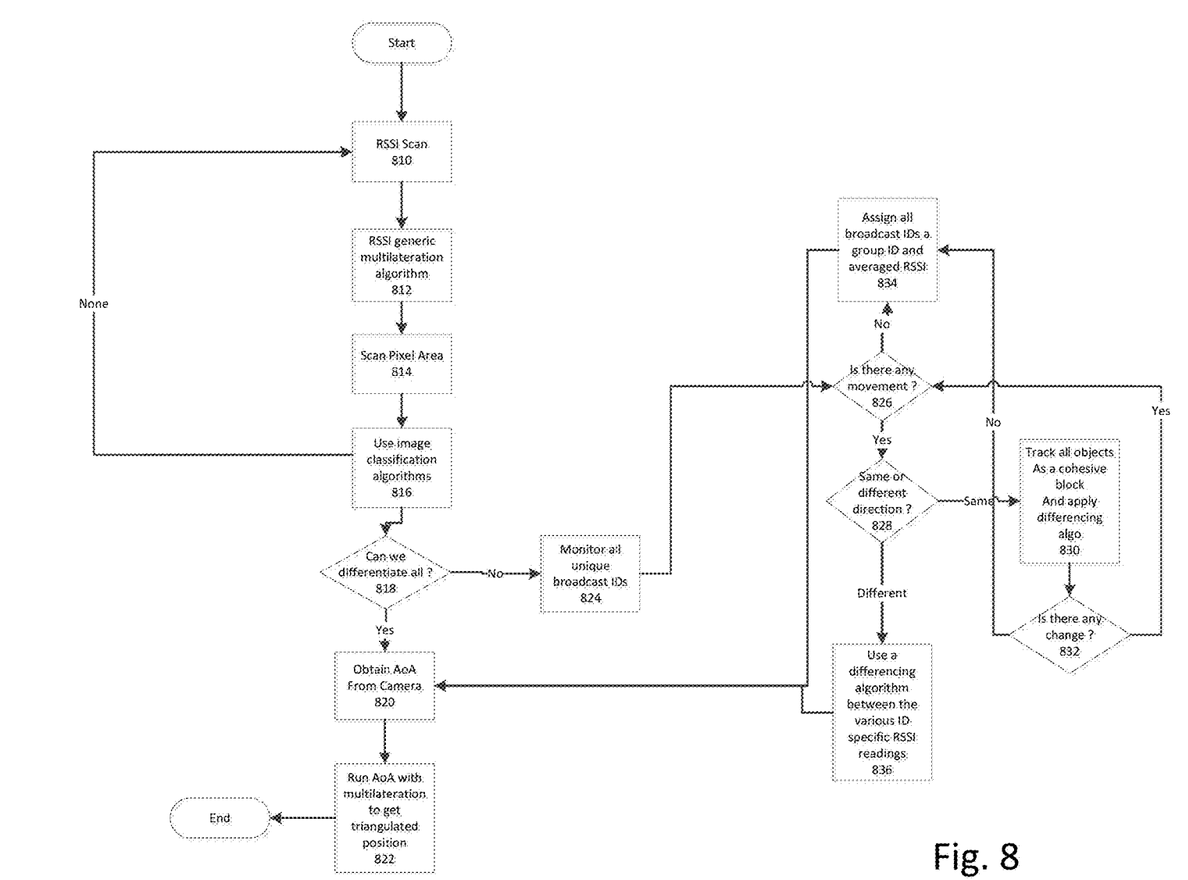
FIG. 8 is a flow chart illustrating an example embodiment for multiple device detection.

In many instances, however, multiple devices may be within multilateration zone. FIG. 8 is a flow chart illustrating example embodiments for multiple device detection within the same RSSI multilateration area. Like the single device detection methodology, multiple devices within the same multilateration can be detected by scanning, via the wireless access points, for the RSSI and/or broadcast signature of a device (step 810).

Once the RSSI and broadcast signature of the device on two or more wireless access points are received, a generic RSSI multilateration algorithm can be used to obtain an initial approximate area where the object is located (step 812). Assuming that the approximated area is located in the FOV of the camera, the camera can perform a scan of the corresponding pixel grid using machine vision techniques in that initial area (step 814), and any targets within the image can be classified using one or more image classification algorithms (step 816) that match the detected targets to known objects. If no objects are within the camera's FOV or captured image, the RSSI scan (step 810) can be repeated until an object is detected.

The system then determines whether any of the devices detected within the machine vision scan are of the same or different type using the known/unknown method discussed in FIG. 4 (step 818). If the system can differentiate between the devices, then Angle of Arrival is obtained from the camera (step 820) and the position of each device is triangulated based on running the multilateration models with the Angle of Arrival information (step 822).

However, the methodology differs when the system cannot completely differentiate the devices. The reasons for this could be multiple instances of similar devices closely packed together, NLOS devices with LOS devices closely packed together, etc. In these cases, all unique broadcast ID's can be monitored and/or all of these devices can be assigned a group ID and continuously tracked over a period of time (step 824). Various methods of separating the various members of a group into individual devices are discussed below, depending on whether there is any device movement (step 826).

Assuming there is device movement, the system and/or camera determines whether any devices are diverging or moving in a different direction than the group of devices (step 828). If there is no divergence or the direction of movement is the same, the multiple devices are tracked within the image captured by the camera as a cohesive block and a differencing model is applied to the broadcast signal to extract broadcast signals for each device (step 830). For example, a particular broadcast signature with a unique portion (say, a strong signal at 30 kHz that is not shared by other devices) can be inferred as a device within the group, and that signature can be subtracted through the differencing model from the group's signature. The removal of the signature may help in identifying other broadcast signals embedded within the group signature.

The system/camera can continue to track the group of devices in an effort to further distinguish broadcast ID's from the rest of the group (step 832). If there is no change in device location with respect to the other devices, the system/camera can assign the group's broadcast signature an averaged RSSI ID (thus including a mixture of all the broadcast IDs) (step 834).

If there is device movement, such as determining through machine vision that at least one of the devices is moving in a direction that diverges from the group, the moving or diverging device can be visually identified by the camera once it has separated further than the camera's resolution limit. The identification can then be matched to a broadcast signature, and the broadcast signature associated with the visually identified device can be removed from the group's broadcast signal (step 836), such as through one or more differencing models. Accordingly, through these various methodologies, individual devices within a group of indistinguishable devices can be detected, identified, and separated from the group.

Figure 9:
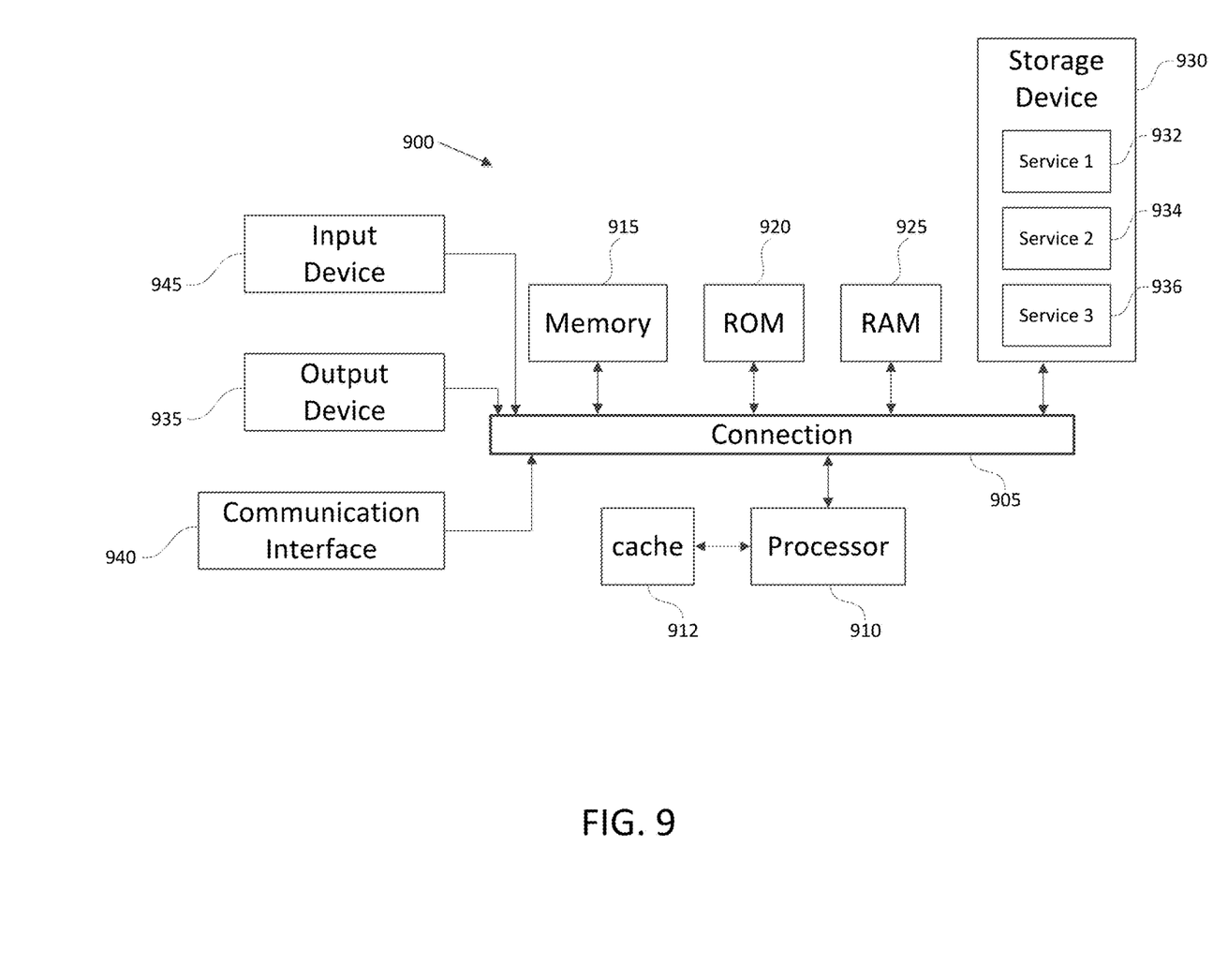
FIG. 9 shows an example of a system for implementing certain aspects of the present technology.

FIG. 9 shows an example of computing system 900 that can be used in combination with the embodiments discussed above. For example, computing system 900 can represent any of FIGS. 1-3 and/or 5-7, or a combination of such devices. In computing system 900 the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) and random access memory (RAM) to processor 910. Computing system 900 can include a cache of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for enhancing target positioning comprising:
an access point for capturing a broadcast signal from a device, wherein a first position area of the device is determined by analyzing the broadcast signal; and
a camera in communication with the access point to receive the first position area from the access point, the camera including computer readable instructions stored thereon that are effective to:
scan pixels within the received first position area in an image captured by the camera;
based on the scanned pixels, detect at least one target within a portion of the pixels, wherein the target can be comprised of at least one of the device or a person associated with the device;
classify the target within the image; and
based on the classification and portion of the pixels including the target, triangulate a second position area of the at least one target within the first position area of the image.

2. The system of claim 1, wherein at least two access points capture the broadcast signal from the device, and wherein the first position area of the device is determined by analyzing the broadcast signal according to a multilateration model.

3. The system of claim 1, wherein the classification of the target further comprises instructions to:
identify a broadcast signature within the broadcast signal; and
identify a type of the device based on comparing the broadcast signature with a plurality of stored broadcast signatures with associated device information.

4. The system of claim 1, wherein the classification of the target further comprises instructions to:
identify a type of the device based on machine vision applied to at least one of the first position area or the second position area.

5. The system of claim 3, wherein an identifier that identifies the vendor of the device is determined from the broadcast signature, and wherein the type of the device is determined from the vendor.

6. The system of claim 1, the instructions effective to:
identify the device based on an application installed on the device, wherein the application is associated with a user assigned to the device;
classify the target in the second area as a first person; and
based on machine vision applied to the first person, determine that there is a discrepancy in possession of the device by identifying that the first person is not the user assigned to the device.

7. The system of claim 1, the instructions effective to:
receive a broadcast signature within the broadcast signal from the first position area;
identify a type of the device based on machine vision applied to the first position area; and
update a broadcast signature store based on the received broadcast signature and identified type of device.

8. The system of claim 7, wherein the updated broadcast signature dynamically updates a multilateration model.

9. The system of claim 1, the instructions effective to:
identify, based on the broadcast signal captured by the access point, that a plurality of devices associated with a plurality of targets are within the first position area;
determine that at least one device within the plurality of devices cannot be visually differentiated by machine vision;
track movement of the plurality of targets within the image as a cohesive block; and
apply a differencing model to the broadcast signal to extract broadcast signals for each device.

10. The system of claim 1, the instructions effective to:
identify, based on the broadcast signal captured by the access point, that a plurality of devices associated with a plurality of targets are within the first position area;
determine that at least one device within the plurality of devices cannot be visually differentiated using a machine vision technique;
track movement of the plurality of targets within the image;
determine, using the machine vision technique, that at least one target within the plurality of targets is moving in a direction that diverges from the plurality of targets;
for the at least one target, visually identify the associated device; and
remove, from the broadcast signal, the broadcast signature associated with the visually identified device.

11. The system of claim 1, the instructions effective to:
identify, based on the broadcast signal captured by the access point, that a plurality of devices associated with a plurality of targets are within the first position area;
determine that at least one device within the plurality of devices cannot be visually differentiated using a machine vision technique;
based on no diverging movement within the plurality of targets, assign all broadcast signals a group identifier and average the broadcast signal.

12. The system of claim 1, the instructions effective to:
determine that a machine vision technique cannot detect the device associated with the target;
track the target; and
when the device is detectable using the machine vision technique, identify the device.

13. The system of claim 1, wherein the classification of the target is based on a model in the cloud.

14. A method of enhancing target positioning comprising:
receiving, from an access point, a broadcast signal from a device, wherein a first position area of the device is determined from an analysis of the broadcast signal;
determining a second position area of the target within the first position area by:
scanning pixels within the received first position area in an image captured by the camera;
based on the scanned pixels, detecting at least one target comprising a portion of the pixels, wherein the target can be comprised of at least one of the device or a person associated with the device;
classifying the target within the image; and
based on the classification and portion of the pixels comprising the target, triangulating the second position area of the target within the first position area of the image.

15. The method of claim 14, wherein receiving the broadcast signal comprises capturing the broadcast signal from the device with at least two access points, and wherein the first position area of the device is determined by analyzing the broadcast signal according to a multilateration model.

16. The method of claim 14, the method further comprising:
identifying the device based on an application installed on the device, wherein the application is associated with a user assigned to the device;
classifying the target in the second area as a first person; and
based on machine vision applied to the first person, determining that there is a discrepancy in possession of the device by identifying that the first person is not the user assigned to the device.

17. The method of claim 14, the method further comprising:
identifying, based on the broadcast signal, that a plurality of devices associated with a plurality of targets are within the first position area;
determining that at least one device within the plurality of devices cannot be visually differentiated by machine vision;
tracking movement of the plurality of targets within the image;
determining, by machine vision, that at least one target within the plurality of targets is moving in a direction that diverges from the plurality of targets;
for the at least one target, visually identifying the associated device; and
removing, from the broadcast signal, the broadcast signature associated with the visually identified device.

18. A camera comprising:
at least one receiver for receiving, from an access point, a broadcast signal from a device, wherein a first position area of the device is determined from an analysis of the broadcast signal; and
at least one processor and at least one memory containing instructions that, when executed, cause the at least one processor to determine a second position area of the target within the first position area by:
scanning pixels within the received first position area in an image captured by the camera;
based on the scanned pixels, detecting at least one target comprising a portion of the pixels, wherein the target can be comprised of at least one of the device or a person associated with the device;
classifying the target within the image; and
based on the classification and portion of the pixels comprising the target, triangulating the second position area of the target within the first position of the image.

19. The camera of claim 18, wherein at least two access points capture the broadcast signal from the device, and wherein the first position area of the device is determined by analyzing the broadcast signal according to a multilateration model.

20. The camera of claim 18, wherein the at least one processor is further configured to:
identify the device based on an application installed on the device, wherein the application is associated with a user assigned to the device;
classify the target in the second area as a first person; and
based on machine vision applied to the first person, determine that there is a discrepancy in possession of the device by identifying that the first person is not the user assigned to the device.

* * * * *